March 19, 1935.　　　I. I. SIKORSKY　　　1,994,488
DIRECT LIFT AIRCRAFT
Filed June 27, 1931　　9 Sheets-Sheet 1
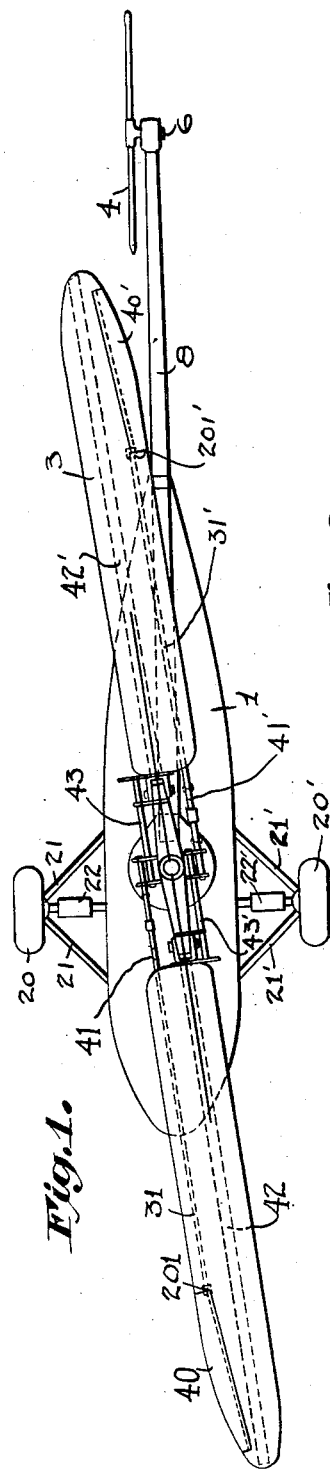
Inventor
Igor I. Sikorsky,
BY
ATTORNEY March 19, 1935.     I. I. SIKORSKY     1,994,488
DIRECT LIFT AIRCRAFT
Filed June 27, 1931     9 Sheets-Sheet 2
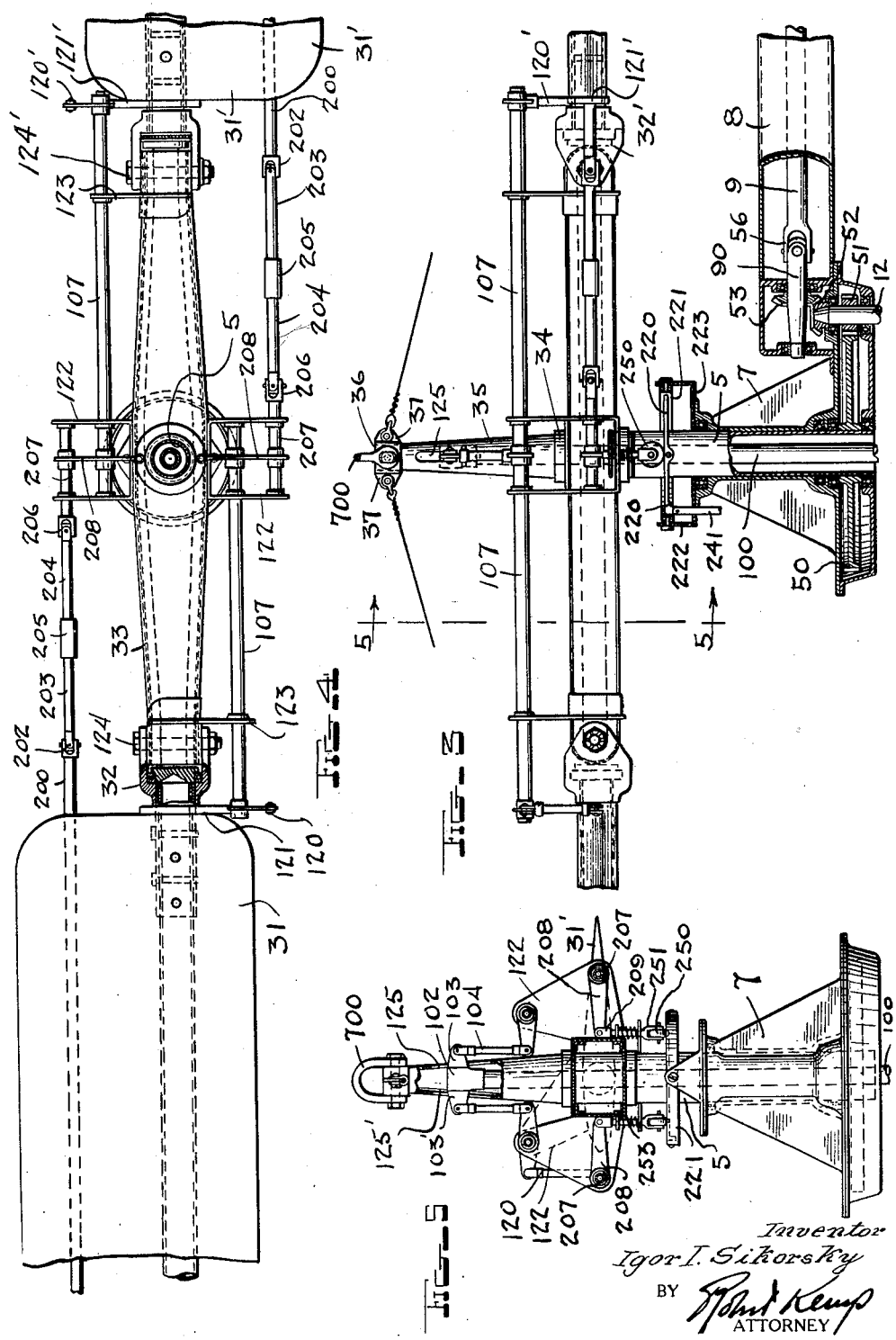

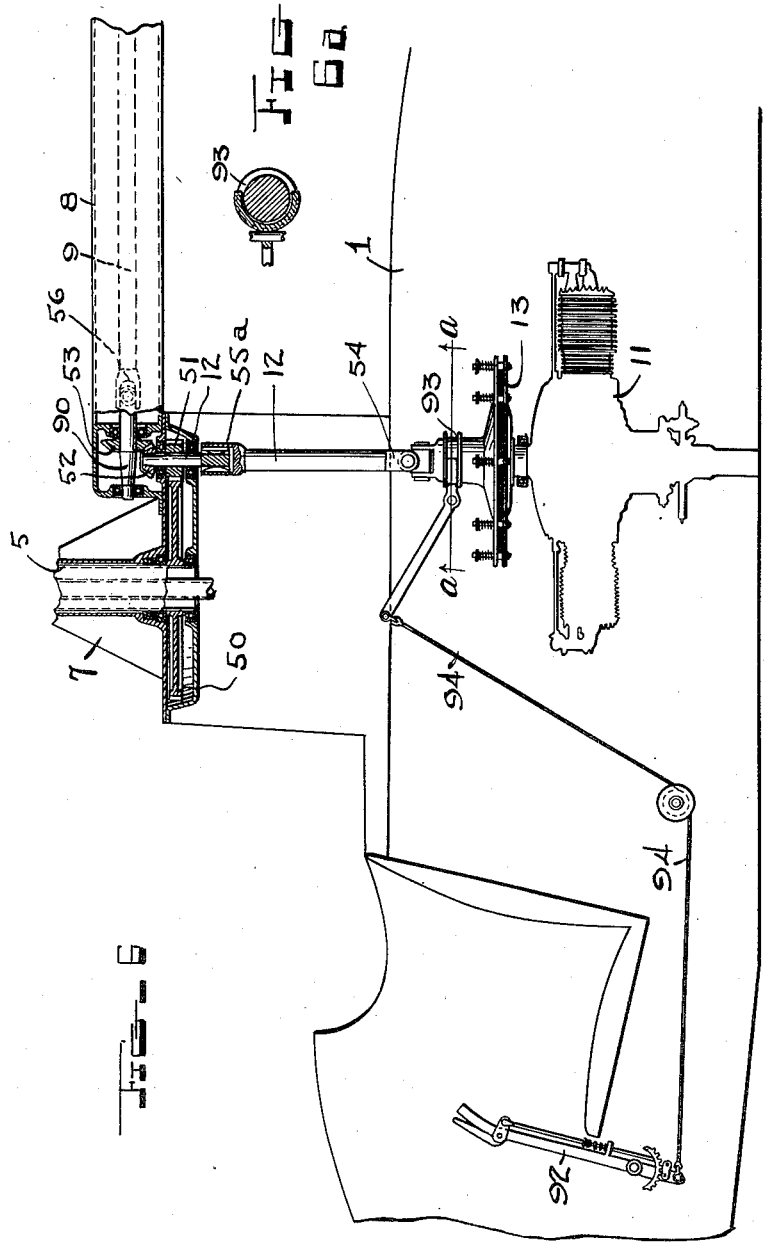

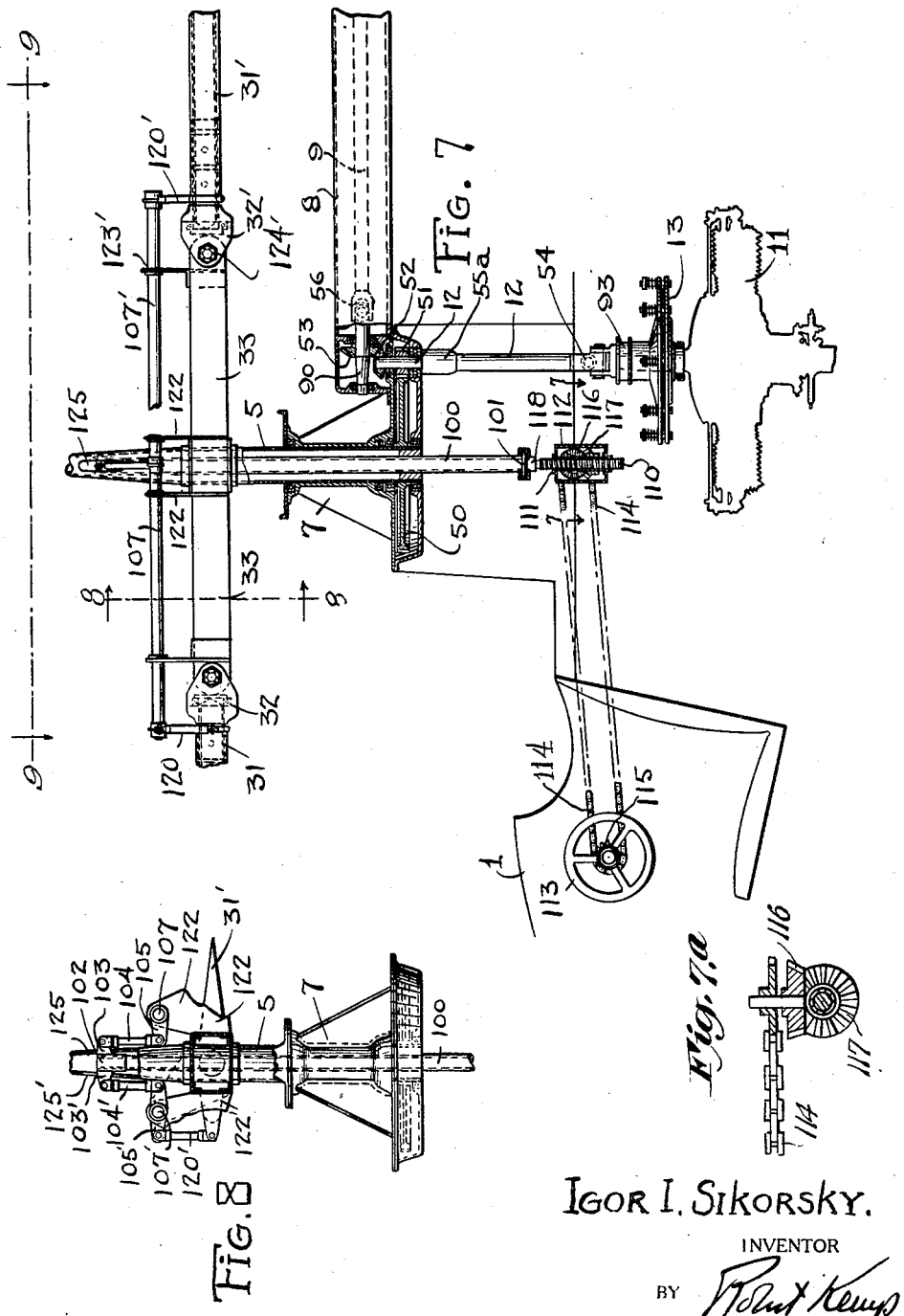

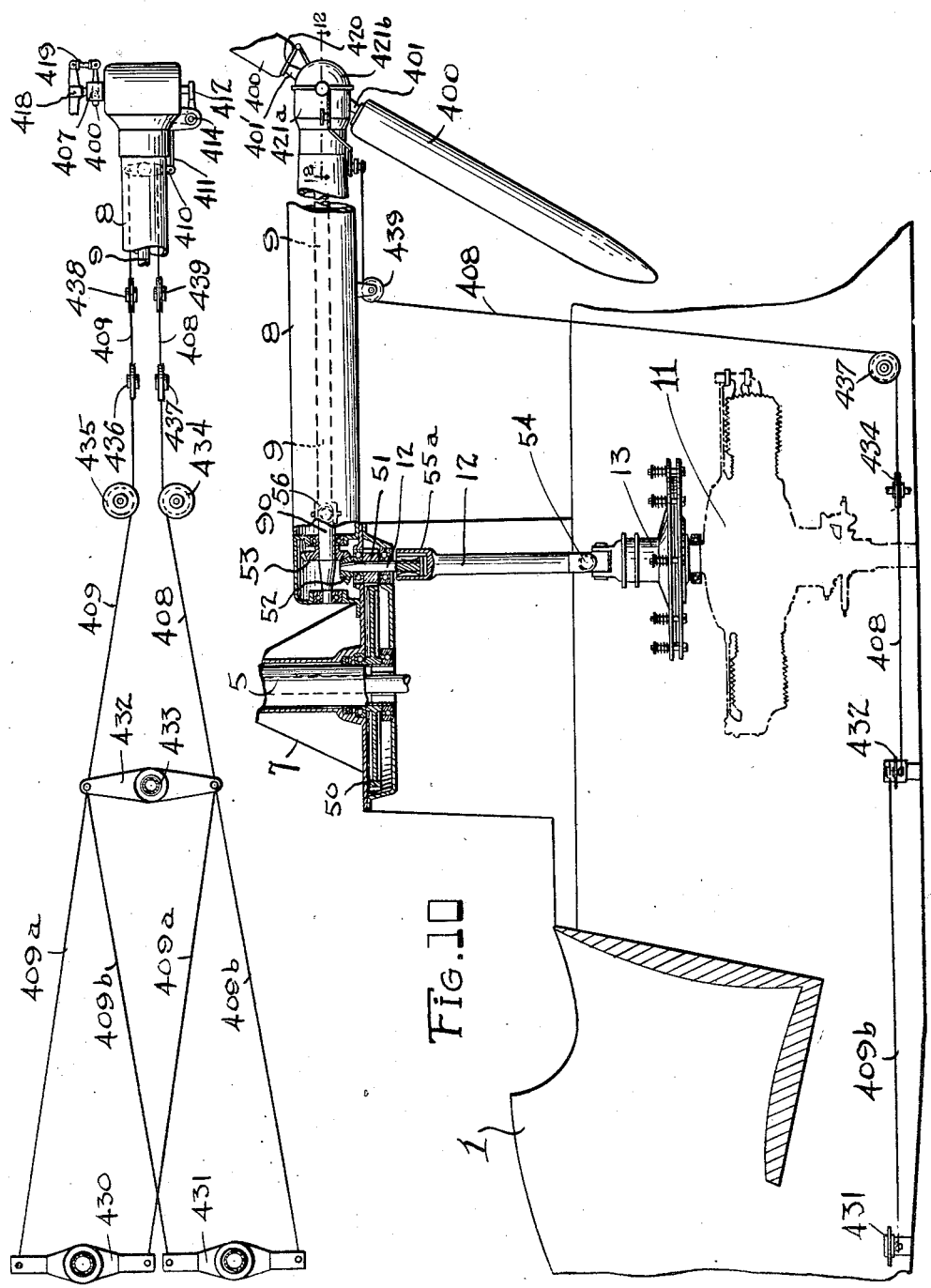

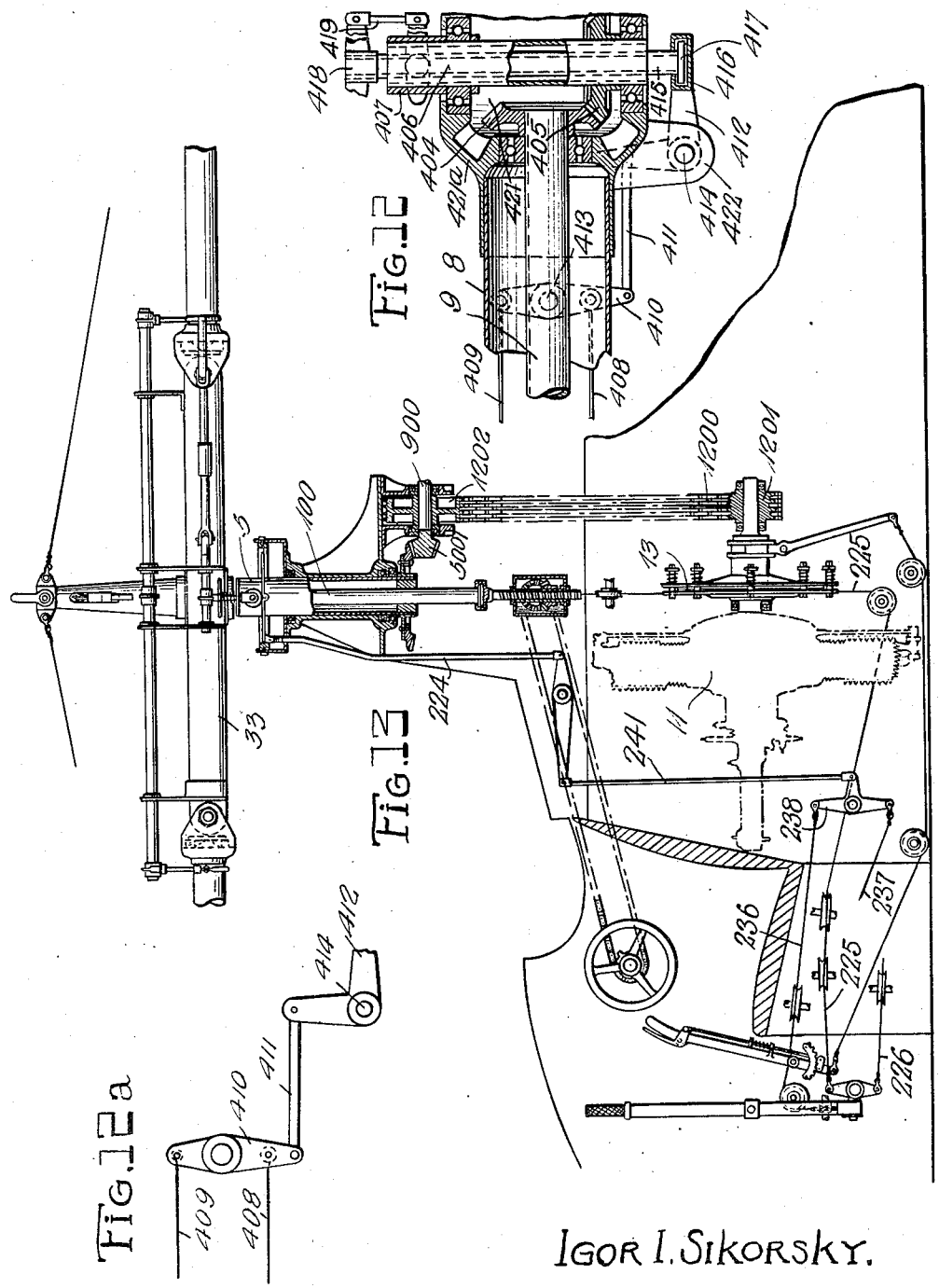

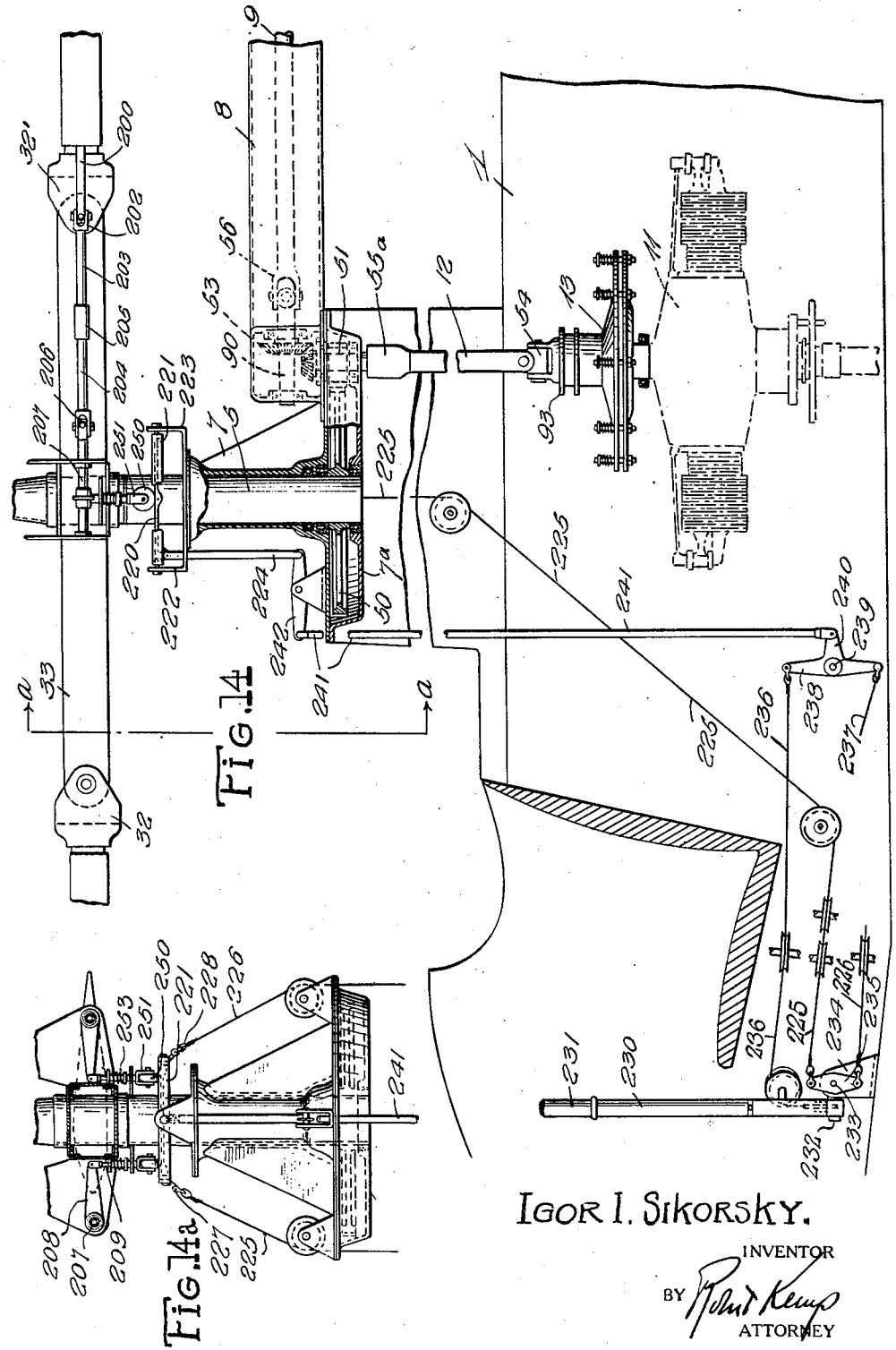

March 19, 1935.　　　I. I. SIKORSKY　　　1,994,488
DIRECT LIFT AIRCRAFT
Filed June 27, 1931　　9 Sheets-Sheet 8
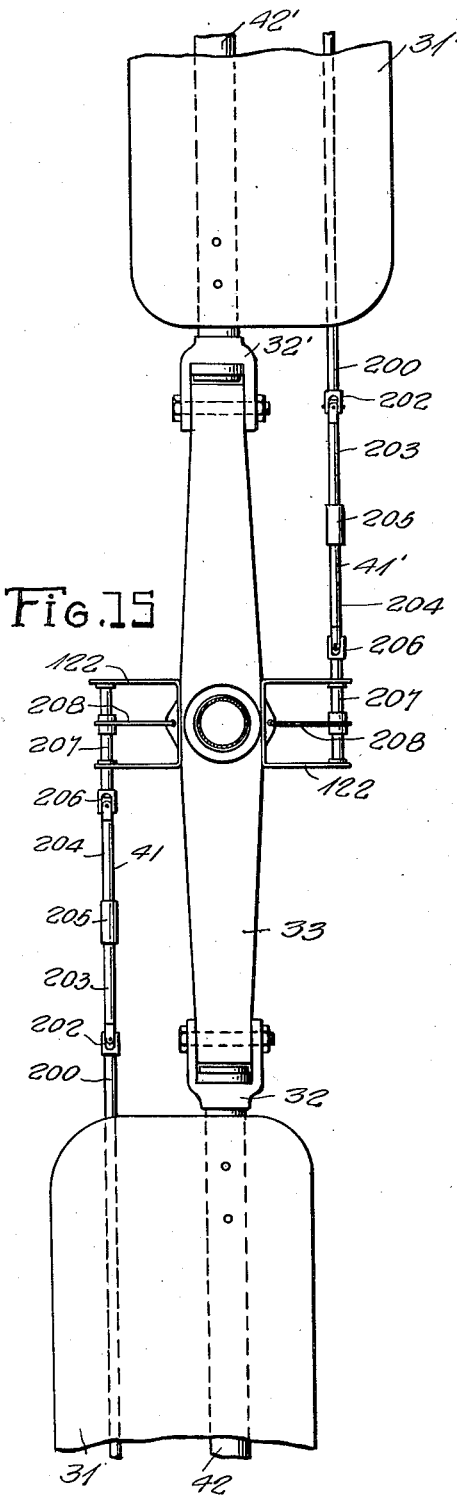
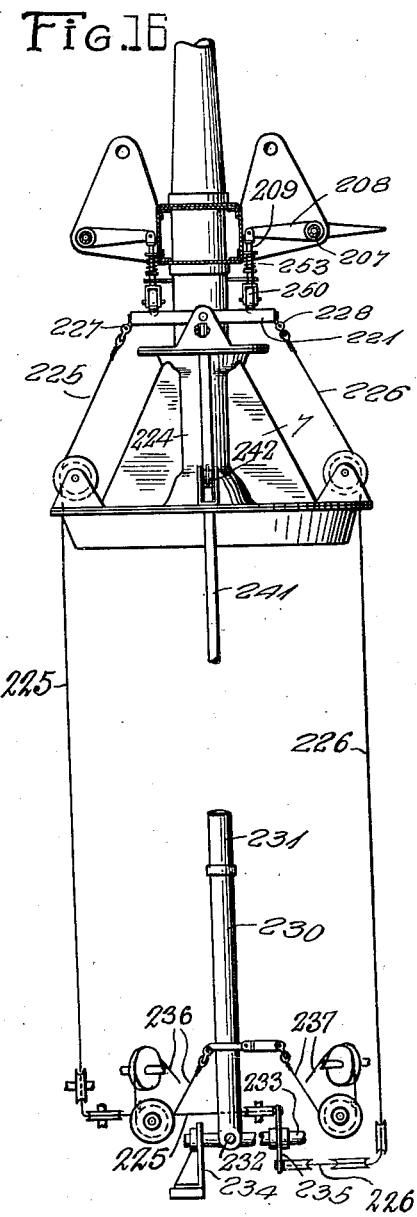
IGOR I. SIKORSKY,
INVENTOR.
BY Robert Kemp
ATTORNEY.

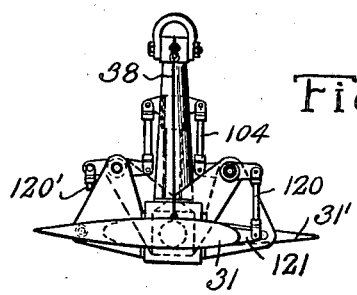
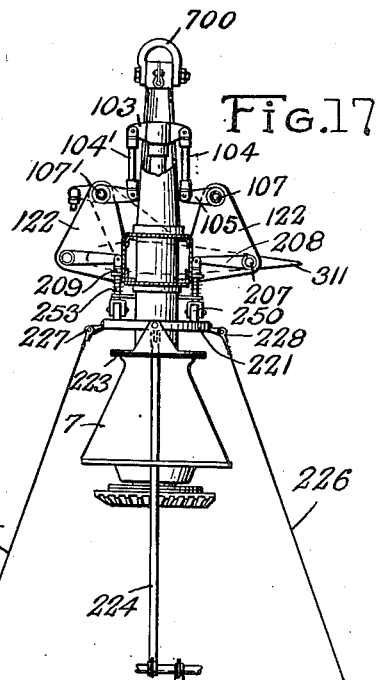
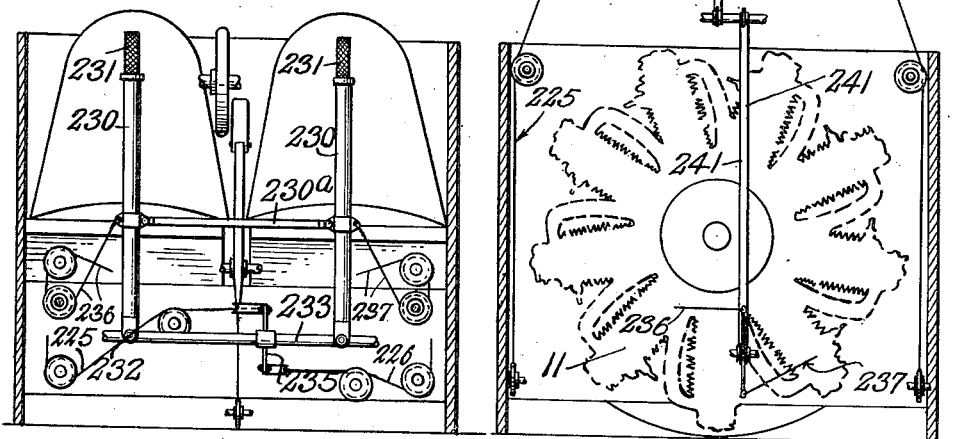

Patented Mar. 19, 1935

1,994,488

UNITED STATES PATENT OFFICE 1,994,488

DIRECT LIFT AIRCRAFT

Igor I. Sikorsky, Nichols, Conn., assignor, by mesne assignments, to Sikorsky Aircraft Corporation, a corporation of Delaware Application June 27, 1931, Serial No. 547,343

23 Claims. (Cl. 244—19)

The present invention relates to aircraft, and more especially to aircraft of the direct lift type.

The object of my invention is to solve successfully such direct lift aircraft problems as torque compensation, directional steering, and the application of power to a vertical lift producing propeller, either by a power plant or by means of air through which the vehicle navigates.

A further object of the invention is the creation of a cheap, simple and easily operated mechanism for controlling the lateral and longitudinal stability of the aircraft and guide it positively in its various directions of flight.

It includes means for producing direct lift, apparatus for compensating the torque of said lift producing means, and a particular arrangement of power plant, power drive and driving gear, power plant controls, together with other controls for producing lateral stability and altering the vertical, lateral and longitudinal direction of flight.

It further embodies such mechanical details as a hinged variable angle vertical lift propeller with variable pitch blades, mechanism for varying the pitch of these blades, ailerons mounted on the blades of said vertical lift propeller, extensible and universally jointed aileron operating rods, a variable pitch torque compensating propeller, variable pitch mechanism for varying the pitch of said vertical lift propeller, said mechanism including a substantially vertical push rod connecting through lever arms, bell cranks and push rods to the blades of said vertical lift propeller and a screw controlled means for actuating said vertical push rod, said screw control means being remotely controlled by a hand control wheel positioned adjacent to the pilot. It includes extensible and universally jointed aileron operating rods, a variable pitch torque compensating propeller, the mechanism for varying the pitch of said compensating propeller, rudder bar controls and a control cable system for operating said mechanism the rudder bars being arranged for either single or dual control.

It further embodies aileron actuating mechanism including a circular table cam mounted in gimbals, also rollers and push rods which move aileron operating rods, the special cam in turn being tilted up and down, fore and aft, and up and down sidewise by special control connections leading to a single or dual form of stick control, this joy stick controlling the table cam, and through the cam accomplishing the hinged movement of said ailerons mounted on each of the blades of the vertical lift propeller. All of said features may, in accordance with the present invention, be either used alone or in combination with each other and with all of the above-mentioned apparatus on the aircraft.

In the drawings:

Figure 1 is a plan view of my direct lift aircraft.

Figure 2 is a side elevation of the aircraft shown in Fig. 1.

Figure 3 is a side elevation of the central portion of my vertical lift producing members with their driving gear partly in section, and partly in elevation.

Figure 4 is a plan view of the upper portion of my apparatus illustrated in Figure 3.

Figure 5 is a view taken along the line 5—5 in Figure 3.

Figure 6 is a more complete view, partly in section and partly in elevation of my driving gear for my direct lift aircraft showing the shaft, power plant, clutch, and clutch operating control in elevation.

Figure 6a is a view shown partly in section along the line a—a in Figure 6.

Figure 7 is a view partially in cut section and partially in elevation, of the interior arrangement of my vertical lift aircraft showing a side view of the controls for controlling the variable pitch mechanism of my vertical lift propeller.

Figure 7a is a view taken along the lines 7—7 of Figure 7.

Figure 8 is a view taken along the line 8—8 as shown in Figure 7.

Figure 9 is a plan view partially cut away taken along the lines 9—9 in Figure 7.

Figure 10 is a cut view, partially in section and partially in elevation, of the interior arrangement of my vertical lift aircraft showing a side view of the controls for controlling the variable pitch mechanism of my torque compensating propeller.

Figure 11 is a plan view of the controls shown in side view in Figure 10.

Figure 12 is a cut section through the center line along the line 12—12 in Figure 10.

Figure 12a is a view more in detail of the controls of the mechanism shown in Figures 10, 11, and 12.

Figure 13 is a view showing a chain drive which may be used as an alternate driving mechanism arrangement to the shaft drive illustrated in Figure 10.

Figure 14 is a view of a portion of my direct lift aircraft partially in elevation and partially in section showing in detail aileron control mounting and mechanism.

Figure 14a is a view taken along the lines a—a in Figure 14.

Figure 15 is a plan view of the vertical lift propeller showing aileron control mechanism.

Figure 16 is a view more in detail of the apparatus shown in Figure 14a with stick control connected for controlling the movement of ailerons out on the blades of the vertical lift propeller.

Figure 17 is a view of the control system for controlling aileron movement positioned in my direct lift aircraft in front of the motor which in this view is turned up in its side.

Figure 18 is a more detailed view of the top of my direct lift aircraft showing the guy wire on one side of the direct lift propeller, with reference to the aileron control mechanism.

Figure 19 is a picture of the dual aileron control mechanism with both stick controls mounted on a common control shaft.

In the construction and operation of direct lift aircraft difficulties have heretofore been encountered in embodying in a single structure the necessary apparatus for controlling the height and vertical movement of the craft while in flight and simultaneously controlling the stability and directional motion of the craft while it is being navigated through the air. Most helicopters have relied upon two vertical propellers going in the opposite direction, or rotating on the same shaft oppositely as a means of compensating torque in this direct lift portion of the flying machine. It has been difficult in such previous constructions to develop a mechanism which would be light in weight, simple to construct and cheap to produce. It has also been difficult to co-ordinate any form of torque compensation apparatus with means for stabilizing a direct lift aircraft and at the same time accomplish directional control and then create control mechanism for all of these operations which would at the same time be simple and inexpensive to build.

It is well known that if the usual helicopter stops in its flight that it meets usually but one fate, that is, a precipitous plunge from whatever height it may be in the air. I have devised an automatic means and method for varying the pitch of the blades in the vertical lift propeller toward a negative angle of incidence, instantly the blades of the vertical lift propeller slow down in their rotation. My invention further contemplates the connected operation in unison of the vertical lift propeller and the torque compensating propeller either with or without power from the power plant. Previously it has been difficult to coordinate any form of torque compensation apparatus with means for directional steering and then evolve controls for both which would be likewise simple and inexpensive to build. It is toward the solution of these various constructional, commercial and directional lift aircraft operating problems that the present invention is directed. I propose a single vertical lift propeller, coupled to a torque compensating propeller, a control for varying the pitch of the vertical propeller, another control for varying the pitch of the torque compensating propeller, the two controls and both propellers combining, inter-dependently in their operation through a system of gearing which enables and causes both propellers to operate in unison at all times, with or without the aid of the power plant driving the mechanism.

In the drawings, a body or car 1, rests, when on land, on a landing gear 2. It also carries through a mounting 7 a plurality of rotating wings, or in other words, a vertical lift propeller 3. Beyond the circular tract of this propeller another screw or torque compensating propeller 4 whirls about a substantially horizontal axis 6 carired by an arm 8 which is connected to mounting 7 and to body member 1 through a pair of struts shown as 10 and 10'.

In the car or body, a motor or power plant 11 drives a shaft 12 which shaft 12 drives through a combination of spur and bevel gears the vertical propeller 3 and the torque compensating propeller 4. Clutch 13 is so positioned as to permit the operator to connect or disconnect motor 11 from drive shaft 12.

In the present embodiment of my direct lift aircraft body or car 1 when resting or running on the ground makes use of wheel numbers 20 and 20'. These wheels rotate on axles 21 and 21', shock absorbing elements 22 and 22' may be and preferably are hydraulic, telescopic, strut members as shown.

Frequently my body or car member is a boat structure in which instance I prefer to use a hydraulic, telescopic, retractable landing gear system.

It will be noted from the drawings that my vertical propeller 3 in its preferred form consists in a pair or plurality of blade members 31 and 31' hinged at 32 and 32' to a hub member 33 carried by an upright axle 5. This hub member is fixedly mounted at 34 to axle 5 preferably just below its tapered section 35.

By means of a terminal cap 36 having suitable ears 37 guide wires or brace wires 38 and 38' lead out and are fastened to blade members 31 and 31' at 39 and 39'.

Each propeller blade carries an aileron designated on the drawings as 40 and 40. These ailerons are tilted by means of shafts 41 and 41' whereas the entire blade itself may be tilted about its own axis or circular wing beams 42 and 42' by means of blade pitch changing rods 43 and 43'.

In accordance with the drawings it will then be noted that the vertical lift propeller blades may not only be deflected upward since they themselves are on hinges but that simultaneous pitch alteration of the blades of the propellers may be effected through the above-mentioned mechanism and the position of the ailerons with respect the surfaces of the blades may also be altered. Since as is usual in aileron construction and installation the ailerons are hingedly mounted along their front to the vertical propeller blades, which are really long thin plane members.

By means of a large spur gear keyed to axle 5, the spur gear being designated by numeral 50, the axle 5 is rotated. This gear 50 in my preferred embodiment is driven by a smaller spur gear 51 mounted on drive shaft 12. This drive shaft also carries bevel gear 52 keyed to it. A second bevel gear shown at 53 is keyed to stub shaft 90. The keys for these various shafts have not been shown in the drawings nor have the ball-bearing mountings for the various shafts been designated by numerals.

Through this above combination of gearing it will then be apparent that vertical lift propeller 3 and torque compensating propeller 4 will operate in unison when actuated by motor 11. Universal joints are shown at 54, 55 and 56 to care for any uneven positions the various mechanisms may be compelled to assume either during or in flight.

A modified form of drive is shown in Fig. 13 in which the engine 11 is shown arranged with its axis horizontal instead of vertical as shown in Fig. 10. The same clutch and clutch operating mechanism is used except that it is arranged horizontally instead of vertically. The clutch drives a sprocket 1201 over which is trained a chain 1200 which in turn drives the sprocket 1202 mounted on shaft 900, which shaft drives the torque compensating propeller in the same manner as shaft 9 in Fig. 12. Bevel gear 5001 is secured to the shaft 900 and drives a bevel gear secured to the axle 5 thus providing a drive in which the vertical and torque compensating propellers are always connected together but may be connected to the motor at will.

In the drawings a simple form of clutch control is shown wherein by the forward or reverse motion of a lever arm 92 and clutch 13, motor 11 may be engaged or disengaged from drive shaft 12 through yoke 93 and control cable 94.

While I may adjust the pitch of my blades, or plane surfaces, in the main vertical lift propeller in a variety of ways, I find it preferable in the present instance to use the combination of mechanism shown in the drawings and described substantially as follows:

A push rod designated as 100 extends upwardly through hollow axle 5 carrying at its lower end a flange 101 and at its upper end a terminal member 102. This terminal is preferably provided with ears 103 and 103' from which depend connecting elements 104 and 104' which through rocker arms 105 and 105' and 106 and 106' serve to partially rotate hollow rods 107 and 107'.

The propeller blades or planes or supporting surfaces 31 and 31' are preferably mounted on swivel members 322 and 322' which rotate freely in the outer portions 32A and 32A' of hinge members 32 and 32'.

The upward and downward movement of push rod 100 is accomplished by screw member 110 mounted in a female screw 111 which in turn is mounted in a gear box 112 and adapted to rotate therein, screwing male member 110 up or down as the case may be. A hand wheel 113 preferably moves chain 114 by means of sprocket not show on the drawings. Bevel gear 116 when it rotates then turns bevel gear 117 which is keyed to female screw 111 by a key not shown. It will be evident that the movement of bevel gear 116 and bevel gear 117 will through the rotation of part 111 accomplish the up and down movement of screw 110 which through a swivel mounted terminal 118 grips and causes the up and down movement of push rod 100.

When rod 100 is pushed or pulled vertically the members 104 and 104' through the movement of terminal member 102 in turn push or pull through the partial rotation of hollow shafts 107 and 107' members 120 and 120' which in turn actuate lever arms 121 and 121' which are each rigidly fastened to blade members 31 and 31' respectively.

Bracket members 122 also 122' hold rods 107 and 107' so they may rotate freely through brackets 123 and 123'. Pin members 124 and 124' serve as pivot means for hinges 32A and 32A' to move about hub member 33 which hub member 33 is fixedly mounted on and rotates with the rotation of substantially vertical axle 5. Slots 125 and 125' are shown in the upper tapered end of said axle to admit the up and down movement of terminal member 102 on push rod 100. Ball-bearings are shown but not designated by numeral as located in part 32A in order to permit the free rotation of parts 322 and 322'. In other words, with the exception of push rod 100, terminal member 102, and hub member 33, practically all of the other parts shown above spur gear 50 and carried by hollow axle 5 and hub member 33 are duplicated since the vertical propeller is substantially symmetrical along the center line of axle 5 and hollow push rod 100.

The internal structure of blade member 31 may be of any desired character. However, my preferred form of construction is that of employing pressed and stamped metallic contour members having substantially the correct upper and lower, aero-dynamic contour or shape necessary to form when a suitable cover is applied, the proper shape of blade structure. In the preferred embodiment members 42 and 42' are tubular wing beams. When these contour members are so mounted on said tubular wing beams they make a very rugged, cheap and simple blade structure.

In my present form of direct lift aircraft the torque compensating propeller serves not only as a means of overcoming the torque or turning motion of the vertical direct lift propeller but also is used as a means of directionally steering the aircraft while in flight.

In order to accomplish these two results the torque compensating propeller 4 is provided with blades 400 mounted on tubular members 401 and 401' in a manner which will permit their pitch being altered during their rotation about their substantially horizontal axle 6.

The rotation of torque compensating propeller 4, as previously described and shown in the drawings takes place in unison with the vertical lift propeller or rotating wings 3 by reason of their direct inter-connection through bevel gears 52 and 53. Stub shaft 90 carries a universal joint 56 which in turn connects with the main torque compensating propeller drive shaft 9 driving at its rear end a bevel gear 404. This latter gear meshes with another bevel gear 405 mounted on the drive shaft of the torque compensating propeller 406 which in turn carries the torque compensating propeller hub 407 fixedly fastened to it.

The pitch of the torque compensating propeller is varied by the backward or forward motion of two control cables designated as 408 and 409 respectively, these cables moving a rocker arm element 410, to which is attached a push and pull rod 411 also hingedly attached to a movable rocker arm 412. The rocker arm 410 pivots about pin 413, the rocker arm 412 pivoting about pin 414. Rocker arm 412 also includes a means for grasping the flange end of push rod 415, said means being designated as 416 and the flange end of the push rod as 417.

The back and forth movement of push rod 415 occuring through the right angular movement of part 412 when cables 408 and 409 are pushed or pulled is translated through terminal piece 418 and connecting member 419 and arm 420 into a motion which varies the pitch of the torque compensating propeller blades 400.

The terminal member 418 is symmetrical about its main center line through that portion where it is connected with push and pull rod 415, or in fact it is actually symmetrical about the center line of part 415 the opposite sides of terminal element of 418 each carrying a member similar 419.

In other words, so far as blades and the variable pitch mechanism between the blades and the terminal member 418 are concerned, all parts are duplicated for each blade member and its variable pitch mechanism.

It is further understood that bevel gear 404 is keyed to shaft 9 and that bevel gear 405 is likewise keyed to shaft 406 and that both of these bevel gears are carried by housing 421 which housing in turn is mounted on and carried at the end of a hollow arm 8. It is further noted that housing 421 is actually divided for purposes of ready inspection into two parts that is, the housing proper designated as 421a and mounted on tubular arm 8 and the cover of said housing 421b mounted on part 421a. A bracket member 422 fastened to part 421a carries members 412 and 414.

In the present embodiment of my invention a pair of rudder bars 430 and 431 actuate cables 409a, 409b, 408a and 408b which in turn move rocker arm 432, pivoted about axle 433, to which cables 408 and 409 are respectively attached, guide pulleys are likewise indicated at 434, 435, 436, 437, 438 and 439.

When my aircraft is about to leave the ground and when my direct lift propeller 3 is rotating and beginning to produce a direct lift component on the entire structure, the front nose of the car, body or body boat, as the case may be, is brought around to its proper direction by the pitch variation of the torque compensating propeller as it is whirling. This pitch variation as will be seen from the above description and the drawings is effected by the movement of the rudder bars 430 or 431, and while the aircraft is in flight, these rudder bars perform this function to steer the aircraft.

As the main vertical lift propeller turns and as the rotating wings or blades encounter different air conditions that is, air which is either less dense or more dense on one side or on the other side, at the front or at the rear of their circle of motion, the ailerons mounted on the outer rear side of the blade members are caused to be depressed or raised in accordance with the need for greater or less lift on the part of each blade during the particular arc of movement which that blade is in.

The ailerons themselves are substantially similar in design and construction to the ailerons shown in my copending patent application Serial Number 344,380. In the present embodiment they are assembled to the blade members very much the same way as the ailerons shown in my patent application above referred to are fastened to my metal wing structure.

The main difference in assembling of aileron and blade member in the present instance lies in the use of rod 200 which extends through the blade member in a freely rotated manner and is fastened to the hinged aileron 40 so as to accomplish the hinged motion of said aileron, through the motion of universal joint 201. In my preferred structure aileron control rod 200 is preferably coupled through universal joint 202 to a two part shaft 203 and 204 coupled in its middle by splined sleeve member 205 and carrying another universal joint 206.

In order to accomplish the partial rotation of this combination of shafts, universal joints and splined sleeve the turning of stub shaft 207 is accomplished by means of lever arm 208 rocking up and down from the up and down motion of push rod 209.

It will be noted that mounting 7 carries in its upper portion a circular platform washer shaped cam 220 pivoted in gimbals at right angles, first in a ring 221 which ring in turn is pivoted at right angles to the pivots carrying the circular cam, the ring being pivoted to uprights 222 and 223.

On the front under side of the circular cam a push rod 224 is hingedly fastened so that its up and down motion may accomplish the tilting of said circular cam in a fore and aft direction.

The sidewise motion or tilting of the circular washer cam 220 is accomplished by two control wires 225 and 226 respectively each fastened to opposite sides of the ring member by terminals designated 227 and 228.

In my present form of direct lift aircraft the fore and aft and the sidewise tilting of the washer shaped cam 120 are both accomplished by the movement of my stick control lever 230.

When the pilot grasps the handle of this lever, which we shall designate as 231, he is able through the universal mounting of the control stick 230 at its lower end to move the stick in an arc either frontwards or sidewards. The sidewise motion of the control or joy stick occurs about shaft 232 as a center and the fore and aft motion of the joy stick takes place from the movement of the stick about shaft 233 as a center. Shaft 233 is, of course, mounted in suitable brackets 234 and carries rocker arm 235 to which are fastened upper and lower control wires 225 and 226. Wires 236 and 237, secured at one end to the joy stick 230, lead back and are secured to a rocker arm 238 mounted on shaft 239. This rocker arm 238 has a suitable projection 240 to which is hingedly secured a vertical up and down push rod 241.

So it will be seen that as the pilot moves his stick control from side to side he accomplishes the vertical motion up or down of push rod 241 which when its motion is reversed by a pivoted lever arm 242 becomes a down and up motion of push rod 224 and tilting washer shaped cam 220.

As the rollers 250 carried by the lower end of shaft or push rod 209 through yoke 251 and axle pin 252, are held down against the face of the washer shaped cam by spring 253, the position of said cam will determine the extent of the angular motion of lever arm 208 and aileron control rod 207.

In other words, as the hub 33 and axle 5 of the vertical propeller rotate carrying the blade members of the vertical screw around in substantially horizontal or a disc shaped plane the rollers 250 will ride around right down on the face of the cam or up on the face of the cam just as the cam is tilted by the control stick under the hand of the pilot.

For instance, if the pilot desires to increase the lift of his blade in his vertical lift propeller as these blades swing in the front arc of their circle, or we shall say, that portion of their circle of motion over the front of the aircraft car, he would accomplish this result by pulling back on his stick control which motion on the joy stick would tilt circular platform 220 upward in its right half and downward in its left half so that as the roller governing a particular aileron on a blade of the vertical propeller rolled around on the right side of the cam it would lift push rod 209 and by means of rocker 208 and the other members of the aileron shaft chain would cause the aileron on that particular blade of the vertical propeller to be depressed as it swung around in the front arc of its circle.

In like manner the sidewise movement of handle 231 of the joy stick 230 in either direction would by reason of control wires 236 and 237 and control rods 224 and 241 tilt the washer shaped cam fore and aft by reason of the particular manner in which said cam is mounted in ring 221.

A movement of the joy stick handle 231 to the right will pull down the rear side of the cam 220 and tilt up its front side. When the roller 250 and its push rod 209 are on the front side of the cam 220 the aileron controlled by that particular push rod and roller will be depressed because the push rod and roller are riding high. Then when the roller and push rod rotate around to the opposite side where the cam is low, the aileron will not be depressed but will move upward about its hinge.

This form of control, coupled to the fact that the vertical propeller blades are hinged so that they may be deflected upwardly, permits not only an easy correction of the supporting surfaces as they rotate to secure good lateral aerodynamic stability but also allows a simple means for increasing or decreasing the forward or backward motion of the aircraft when it is in actual flight up in the air.

The older idea in constructing direct lift aircraft employing a vertical lift propeller was the construction of the propeller mounting to provide for the propeller as it rotated to be tilted at its hub either fore and aft or to one side or the other so that the body or car below the propeller really in effect was pivotally mounted or swivelled on a universal joint. This older construction involved the use, if the aircraft itself was to be strong and safe, of parts that were unduly heavy and cumbersome and which then would fail to produce the desired results in the correction of lateral and longitudinal stability either as quickly or as expeditiously as they are now produced by my present form of direct lift aircraft construction.

The joy stick control which I employ is one familiar to practically all pilots of present day flying machines and in designing the cam mechanism and its attendant lever arms, push rods, pull cables, etc., I have obtained a form of construction which admits of cheap and rapid machining and assembling by those relatively unskilled in the art of manufacturing aircraft.

It is understood that torque compensating propeller 4 and its shaft 6 are driven through suitable bevel gears by shaft 9.

In its operation clutch 13 allows disconnection of the engine from the vertical shaft, enabling the vertical lift propeller to function as a freely rotating lifting element. As the clutch is opened and the vertical lift propeller functions as a freely rotating propeller, it will be obvious that the torque compensating propeller 4 also then functions as a freely rotating propeller.

Another feature of the invention further resides in the pitch altering mechanism and mounting designated by numerals 120, 121, 123, 107 and the numerals on the same parts on the opposite side of the center of Figure 4. When my direct lift aircraft is in flight and the blade numbers 31 and 31' deflect upward in hinged motion from hinges 32 and 32' the aforesaid pitch altering mechanism then functions automatically to vary pitch of the vertical lift propeller blades towards a negative angle of incidence. In this way, if there is any tendency on the part of the vertical lift propeller blade to slow up in its rotation, either when it is connected to the engine or not, and when on slowing up in rotation the blades of this vertical lift propeller start to fold upwardly, then in that event, it will be noticed that the pitch altering mechanism automatically turns the blades downwardly toward a negative angle of incidence, speeding up their rotary motion and serving as a means to prevent the rotation of the blades from ever stopping while my direct lift aircraft is in flight.

It will be understood that my invention is not limited to the details of construction illustrated and described except as appears hereinafter in the claims.

I claim:

1. In vertical lift aircraft construction, the combination comprising a vertical lift propeller connected to a torque compensating propeller, said vertical lift propeller having hinged blades adapted to freely oscillate about the hinges under the influence of the various forces acting on said blade while in flight, said vertical lift propeller having means for altering its pitch and ailerons for maintaining lateral and longitudinal stability, and means for controlling said pitch altering means, means for controlling said ailerons, means for varying the pitch of said torque compensating propeller and control means for controlling the pitch variation of said torque-compensating propeller.

2. In vertical lift aircraft construction, the combination comprising a multi-bladed vertical lift propeller connected in working relation to a power plant and a torque compensating propeller, said vertical lift propeller having hinged blades adapted to freely oscillate about the hinges under the influence of the various forces acting on said blade while in flight, blade pitch altering means for changing the pitch of said vertical lift propeller, ailerons on said vertical lift propeller, means for controlling said ailerons blade pitch altering means for changing the pitch of said torque-compensating propeller, separate control means for controlling both sets of pitch altering means, drive means between said power plant and both said propellers, a clutch located on said drive means for connecting or disconnecting said power plant from said propellers.

3. In vertical lift aircraft construction, the combination comprising a multi-bladed vertical lift propeller permanently connected in working relation to a torque-compensating propeller, said vertical lift propeller having hinged blades adapted to freely oscillate about the hinges under the influence of the various forces acting on said blade while in flight, ailerons in the blades of said vertical lift propeller, means for continuously operating said ailerons, a power plant driving both propellers and means for connecting and disconnecting said power plant drive.

4. In an aircraft, a propeller blade, hinge means connecting said blade with a support, said blade adapted to oscillate about said hinge under the influence of the various forces acting on said blade during flight, means for controlling the pitch of said blade, ailerons associated with said blade, means to continuously vary said ailerons as said blade rotates and as said blade moves on its hinges.

5. In an aircraft, a propeller blade support, propeller blades hingedly connected to said support and adapted to be driven thereby, said propeller blades being freely movable about said hinged connection, ailerons associated with said blades, mechanical means independent of the air reaction on said ailerons but under the control of the pilot for continuously varying said ailerons as said blade rotates.

6. In an aircraft in combination, a propeller blade support, propeller blades hingedly connected to said support and adapted to be driven thereby, said propeller blades being freely movable about said hinged connection, means for varying the pitch of said blades, ailerons associated with said blades, means under the control of the pilot for controlling the stability and direction of travel of said aircraft by means of said ailerons, a torque compensating propeller, and means for varying the pitch of the torque compensating propeller.

7. In an aircraft, the combination of a rotatable support, an airfoil having pivotal connection thereto about which it may freely oscillate, the axis of said pivotal connection being substantially transverse to the axis of rotation of said support and to the longitudinal axis of said airfoil, ailerons mounted on said airfoil, and means independent of aerodynamic forces to differentially adjust said ailerons to maintain the longitudinal and lateral balance of said aircraft.

8. In an aircraft a propelling and sustaining unit comprising a hub and a plurality of wing members adapted to rotate about a common axis, a pivotal joint between each wing member and the hub whereby each wing may freely and independently oscillate in a plane substantially parallel and radial to said axis, ailerons mounted on said freely oscillatable wing members and adapted to control said aircraft on its longitudinal and lateral axes.

9. In an aircraft, the combination of a rotatable member, an airfoil having a dual pivotal connection thereto, and means adapted to positively alter the angle of incidence of said airfoil on one of its pivots as an axis, said airfoil adapted to freely oscillate about the other pivot under varying flight forces, and ailerons mounted on said airfoil to assist in the directional control of said aircraft.

10. In an aircraft, the combination of a plurality of airfoils mounted for three separate movements with respect to said aircraft, i. e. rotational movement about a common center, oscillating movement about a hinge having an axis substantially transverse to the axis of rotation, and a movement about an axis substantially transverse to the other two, means for positively controlling said last named movement, said oscillating movement being dependent upon the flight forces acting on said airfoil and ailerons mounted on said airfoil adapted to steer said aircraft in two directions.

11. In an aircraft, a rotatable propelling sustaining, and controlling element comprising a plurality of pivotally connected wing members adapted to swing on their pivotal connections to automatically vary the dihedral of said wing members, means for automatically decreasing the pitch of said wings as the dihedral angle increases, means for positively controlling the pitch of said wings to control their lift, and means for periodically varying the lift of said wing to control said aircraft on its longitudinal and lateral axes.

12. In an aircraft, the combination of a rotatable member, an airfoil having a dual pivotal connection thereto, means adapted to alter the angle of incidence of said airfoil by movement about one of its pivots as it moves about its other pivot, means for positively moving said airfoil about its first mentioned pivot and ailerons hingedly mounted on said airfoil for directional control of said aircraft.

13. In an aircraft, a propelling and sustaining unit comprising, a rotatable propeller having blades automatically freely variable in dihedral, and ailerons mounted on said blades and adapted to maintain the balance of said aircraft and directionally control it.

14. In an aircraft, the combination of a rotatable support, a plurality of airfoils having pivotal connection thereto, whereby the dihedral of said airfoils may automatically vary, and ailerons mounted on said airfoils and adapted to control the aircraft on its longitudinal and lateral axes.

15. In an aircraft, the combination of a rotatable support, an airfoil having a pivotal connection thereto about which it may freely oscillate, the axis of said pivotal connection being substantially transverse to the axis of rotation of said support and to the longitudinal axis of said airfoil, ailerons mounted on said airfoil adapted to control said aircraft about its longitudinal and lateral axes, and means for periodically operating said ailerons as said airfoil rotates.

16. Means for controlling a helicopter having a variable dihedral multi-bladed propeller, which comprises means for changing the pitch of said propeller to control its lift, means for periodically and differentially changing the camber of said propeller blades to control the helicopter about its longitudinal and lateral axes, and means for variably opposing the torque reaction of said propeller to control the helicopter about its vertical axis.

17. Means for controlling a helicopter having a variable dihedral multi-bladed propeller, which comprises means for changing the pitch of said propeller to control its lift, means for changing the characteristics of said propeller blades to control the helicopter about its longitudinal and lateral axes and means for variably opposing torque reaction of said propeller to control the helicopter about its vertical axis.

18. In an aircraft having a propeller rotating about a substantially vertical axis, said propeller having blades, said blades being pivotally connected and free to oscillate about their pivots in substantially vertical planes, means for controlling the lift of said propeller, comprising means for changing the pitch of said propeller, means for controlling the direction of travel of said aircraft comprising ailerons on said propeller blades and means for automatically reducing the pitch of said blades as they move on their pivots under the influence of increased lift forces.

19. In an aircraft, a propeller comprising blades, hinged connections between said blades, about which said blades are free to oscillate to vary their dihedral angle, means for changing the pitch of said propeller, ailerons mounted on said propeller, means for periodically operating said ailerons and means for automatically reducing the pitch of said blades as their dihedral angle increases.

20. A direct lift aircraft including in combination a car, a vertical propeller mounted above said car, a torque compensating propeller rotating around a substantially horizontal axis mounted above said car and in a position beyond the swing of the vertical propeller where the movement of the torque compensating propeller will not interfere with the movement of said vertical propeller, bevel gearing connecting said vertical propeller and said horizontal propeller, a motor in said car, a shaft from said motor connected to and associated with said bevel gearing in order to drive both propellers, means permitting said motor to be disengaged from said motor drive shaft, ailerons associated with said vertical propeller, and an extensible shaft for moving said ailerons.

21. In an aircraft, a support adapted to rotate about an axis, a plurality of wings connected with said support, a dual pivotal connection between each wing and said support, means adapted to positively alter the angle of incidence of each of said wings on one of their pivots as an axis, each wing adapted to freely oscillate about its other pivot under varying flight forces to vary the dihedral angle, means to vary the angle of incidence of each wing as it moves about the latter pivot, ailerons mounted on each wing and adapted to vary the lift of said wing, control means for said ailerons independent of the pitch varying means, means for driving said plurality of wings through said support and means permanently geared to said wing to oppose the torque reaction of said wings.

22. A stick control for direct lift aircraft, a vertical lift propeller carrying ailerons and means associated with said propeller and said stick control for moving said ailerons, said latter means including a tiltable circular platform above and around which said vertical lift propeller rotates, said vertical lift propeller carrying lifters, operating through rollers against the face of said tiltable circular platform in a manner whereby said ailerons are moved as said vertical lift propeller rotates, and means for tilting said platform when said stick control is moved, said propeller having blades freely oscillatable under centrifugal and lift forces and means independent of said ailerons for controlling the pitch of said blades.

23. In direct lift aircraft an improved vertical lift screw propeller including a number of hinged blades, ailerons for periodically increasing the lift of said blades as they rotate, a hub for said vertical propeller fastened to an axle on which said hub swings, a circular tiltable control platform for controlling said ailerons and a stick control for tilting said platform, gimbal mounting for said platform and means associated with said stick control and said platform whereby the movement of said stick fore and aft about a hinge at its lower end will tilt said platform up and down from a horizontal position on a pair of side pivots, and other means associated with said stick control and said platform whereby the lateral movement of said stick control on a hinge adjacent its lower end will tilt said platform sidewise from a horizontal position on a pair of front and back pivots.

IGOR I. SIKORSKY.